US006092843A

United States Patent [19]

Peterson et al.

[11] Patent Number: 6,092,843

[45] Date of Patent: Jul. 25, 2000

[54] PRESSURE SEAL LICENSE PLATE DECAL

[75] Inventors: Wayne Charles Peterson, Hooksett, N.H.; Mark S. Casper, Williamsville; Jimmie A. Harrod, Grand Island, both of N.Y.

[73] Assignee: Moore U.S.A., Inc., Grand Island, N.Y.

[21] Appl. No.: 08/845,853

[22] Filed: Apr. 28, 1997

[51] Int. Cl.[7] ................................ B32B 3/06; B32B 3/10

[52] U.S. Cl. ............................... 283/116; 283/74; 283/75; 283/81

[58] Field of Search ................................ 283/116, 74, 75, 283/81

[56] References Cited

U.S. PATENT DOCUMENTS

| | | | |
|---|---|---|---|
| 3,545,669 | 12/1970 | Kinkade et al. . | |
| 4,598,860 | 7/1986 | Pennock . | |
| 4,896,823 | 1/1990 | Taylor . | |
| 4,918,128 | 4/1990 | Sakai . | |
| 5,052,613 | 10/1991 | Lin . | |
| 5,201,464 | 4/1993 | File . | |
| 5,267,898 | 12/1993 | Doll et al. . | |
| 5,289,972 | 3/1994 | Sauerwine et al. . | |
| 5,318,324 | 6/1994 | Lombardo et al. . | |
| 5,366,145 | 11/1994 | Sauerwine . | |
| 5,418,205 | 5/1995 | Mehta et al. . | |
| 5,439,255 | 8/1995 | McIntire et al. | 283/61 |
| 5,553,774 | 9/1996 | Goodno . | |
| 5,595,404 | 1/1997 | Skees | 283/56 |
| 5,756,175 | 5/1998 | Washburn | 283/81 |

*Primary Examiner*—Andrea L. Pitts
*Assistant Examiner*—Mark T. Henderson
*Attorney, Agent, or Firm*—Nixon & Vanderhye P.C.

[57] ABSTRACT

A license plate decal is provided on a folded (e.g. Z-folded) business form which acts as a carrier for the decal. A cut out is formed in a panel of the mailer and a patch (such as a glassine patch) is adhesively secured at a peripheral portion to the mailer panel and a release coating is provided on at least a significant part of the central portion of the patch. The decal adhesive engages the release coating so that the decal and its associated pressure sensitive adhesive may be readily removed from the patch. The patch may be secured to the paper on either face thereof; if secured at the bottom face, the patch and decal can flex into the cutout to provide a minimum thickness when in a stack of mailer intermediates. Where the patch is secured at its top face, the maximum thickness of the patch and decal combination is preferably about 0.008 inches, which is significantly less than the thickness at the decal in prior art carriers.

16 Claims, 5 Drawing Sheets

PRESSURE SEAL LICENSE PLATE DECAL

BACKGROUND AND SUMMARY OF THE INVENTION

There are many situations where it is desirable to forward a decal, by mail, to a recipient. The decal may be removed from the mailing piece and applied to any appropriate item, such as a membership card, a vehicle window, or a license plate. When such mailers are being printed (such as with the outgoing address) for mailing, they typically are stacked in a printer tray. In conventional constructions of the carriers which ultimately form the mailers the bulge provided in the area of the decal is greater than desirable typically because the decal laminate is thick. In conventional constructions the thickness at the laminate is typically between about 0.011 inches and 0.0135 inches. This limits the number of sheets that can be stacked in the tray for processing, and in extreme situations may adversely affect feeding of the sheets.

According to the present invention a decal carrier in general, and a mailer type business form intermediate and mailer produced from the intermediate, are provided which facilitate the stacking of more sheets in a printer tray by reducing the thickness of the decal laminate compared to the prior art. The thickness at the decal laminate according to the invention is a maximum of 0.010 inches, and typically is only about 0.008 inches. This not only allows more sheets to be stacked in the printing tray and minimizes the possibility of problems in feeding the sheets to a printer, it makes the ultimate mailing piece thinner and also provides for enhanced utility in handling the decal by the recipient.

The advantageous results are achieved according to the present invention primarily by providing a release coating (such as a silicone coating) directly on a patch which covers a cut out in the carrier for the decal. This allows the decal to be applied directly to the patch, without an intermediate release liner as is common in the prior art. Also the release coating may be provided over substantially the entire face of the patch, with a special adhesive used to attach the patch to the carrier.

Alternatively the advantageous results according to the invention may be obtained by securing the bottom face of the patch to the top face of the intermediate/carrier. This means that when the carrier/intermediate is provided in a stack (such as in a printer), the decal and patch flex into the cutout so that the effective thickness of the patch and decal mounted thereon is substantially the same as the combined thickness of the carrier/intermediate, first adhesive, and patch adjacent the cutout.

According to one aspect of the present invention a decal carrier, in general, is provided. The carrier has the following components: A sheet of paper having first and second faces. A cutout formed in the sheet of paper. A patch having first and second faces, a central area approximately the size of the cutout, and a peripheral area surrounding the central area. A release coating provided on the first face of at least a significant part (at least the size and shape of the decal adhesive which will be placed over it) of the central area of the patch. A first pressure sensitive adhesive disposed between the peripheral area of the patch and one face of the sheet of paper and holding the patch to the sheet of paper. A decal having first and second faces. Indicia associated with the decal. And, a second, permanent, pressure sensitive adhesive associated with the decal second face, the second adhesive engaging the release coating on the patch, and removable from the patch with the decal. The first pressure sensitive adhesive may be disposed between the peripheral area of the patch first face and the second face of the sheet of paper, in which case the patch and decal mounted thereon have a thickness which is a maximum of 0.010 inches (typically about 0.008 inches), or the first adhesive is disposed between the patch second face and the first face of the sheet of paper, allowing the flexing of the decal and patch into the cutout, as described above.

The indicia may be motor vehicle license plate indicia and the indicia may be associated with the decal first face, the decal comprising a license plate decal. However instead the decal may have a reflective material first face, or the indicia may be provided on the second face (such as where the decal is to be applied the inside of a vehicle window), underneath the second adhesive.

In one construction, especially when the first adhesive is between the patch first face and paper sheet second face, the release coating may be a spot coating on the central area of the patch so that the peripheral area of the first face of the patch is substantially devoid of release coating. The first adhesive preferably is permanent adhesive, permanently connecting the patch peripheral area to the paper sheet; it may be repositional adhesive only if the patch doesn't detach and cause printer problems. The release coating may be any suitable release coating, but typically is a conventional silicone release coating. The patch may be of any suitable material and need not be opaque or translucent, but desirably is of the same material as a conventional window patch in a mailer or envelope (e.g. glassine).

According to another aspect of the present invention a mailer type business form intermediate is provided. The intermediate comprises the following components: A quadrate paper sheet having top, bottom, and side edges, and first and second faces, the top and bottom edges substantially parallel to each other and the side edges substantially parallel to each other. First and second fold lines substantially parallel to the top and bottom edges and dividing the sheet into first, second and third panels, the first panel between the top edge and the first fold line, and the second panel between the first and second fold lines. The first and second panels each having a first length along the side edges, and the third panel having a second length along the side edges (e.g. which is less than the first length). A cutout in the second panel. A patch having first and second faces, a central area approximately the size of the cutout, and a peripheral area surrounding the central area. A release coating provided on the first face of at least the majority of the central area of the patch. A first pressure sensitive adhesive disposed between the peripheral area of the patch and one of the faces of the second panel and holding the patch to the second panel. A decal having first and second faces. Indicia associated with at least one of the decal faces. And, a second, permanent, pressure sensitive adhesive associated with the decal second face, the second adhesive engaging the release coating on the patch, and removable from the patch with the decal.

Outgoing address indicia may be provided on the third panel first face, and adhesive means (such as a plurality of patterns of pressure activated cohesive such as described in U.S. Pat. Nos. 4,918,128 and 5,201,464 (the disclosures of which are hereby incorporated by reference herein)). The adhesive means hold the intermediate in a mailer configuration when the paper sheet is folded (e.g. Z-folded) about the first and second fold lines to form a mailer having a second panel sandwiched between the first and third panels and the first face of the third panel forming an outside face of the mailer, and the decal and patch covered by the first and third panels. The details of the decal and patch, and where the first adhesive is provided, may be as described above.

According to another aspect of the present invention a mailer type business form is provided. The mailer type business form comprises the following components: A first solid paper panel. A second paper panel having a cutout therein and first and second faces. A third solid paper panel. The second panel sandwiched between the first and second panels so that the cutout is covered by the first and second panels. Adhesive means for holding the panels to each other with the second panel sandwiched between the first and second panels. A patch having first and second faces, a central area approximately the size of the cutout, and a peripheral area surrounding the central area. A release coating provided on the first face of at least the majority of the central area of the patch. A first pressure sensitive adhesive disposed between the peripheral area of the patch and one of the faces of the second panel and holding the patch to the second panel. A decal having first and second faces. Indicia associated with at least one of the decal faces. And, a second, permanent, pressure sensitive adhesive associated with the decal second face, the second adhesive engaging the release coating on the patch, and removal from the patch with the decal. The details of the patch and decal, and positioning of the first adhesive, may be as described above, and other panels may also be provided.

In the use of the mailer type business form as described above, where the decal comprises a license plate decal, or vehicle sticker, the following sequential steps may be employed: (a) Opening the business form to expose the second panel and patch. (b) Transporting the patch to the vicinity of a motor vehicle having a license plate or windshield. (c) Removing the decal from the patch. And, (d) pressing the second pressure sensitive adhesive of the decal to the license plate or windshield so that the decal is adhesively attached to the license plate or windshield with the decal license plate or registration indicia visible from exterior the vehicle. When the decal is a vehicle registration decal, or the like, it is applied to the interior of a window of a motor vehicle, and in that case the indicia is typically on the decal second face underneath the second adhesive.

It is the primary object of the present invention to provide a simple, effective, and advantageous decal carrier in general, as well as a mailer type business form intermediate and a mailer per se which transport a decal. This and other objects of the invention will become clear from an inspection of the detailed description of the invention and from the appended claims.

DETAILED DESCRIPTION OF THE DRAWINGS

Figure 1:
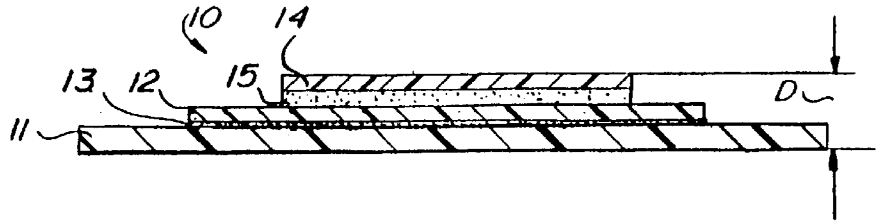
FIG. 1 (PRIOR ART)
FIGS. 1 and 2 side schematic detail views of conventional prior art license plate decal carriers.

FIG. 1 illustrates one conventional prior art construction for a carrier for a license plate decal (of the type that typically provides the renewal year on a license plate, such as used by many states in the United States). The carrier construction 10 includes a sheet of paper 11 having a conventional release liner 12 attached thereto by adhesive 13. On top of the release liner 12 is the decal 14 with permanent pressure sensitive adhesive 15 engaging the release liner 12. The thickness D of this construction is about 0.0135 inches, which provides a significant enough bulge so that if in a paper tray of a printer the number of sheets in the tray is significantly limited, and under extreme circumstances sheet feeding problems may occur. The carrier sheet 11, after printing (such as address information, and perhaps vehicle registration information) is mailed to the license plate owner, who opens the mailer, removes the decal 14 and associated adhesive 15 from the release liner 12 and the sheet 11, and then applies the adhesive 15 to the appropriate place on the license plate so that the decal 14 is permanently affixed to the license plate. Indicia on the decal 14 typically includes the renewal year (e.g. "99" for the year 1999 as the next renewal date).

Figure 2:
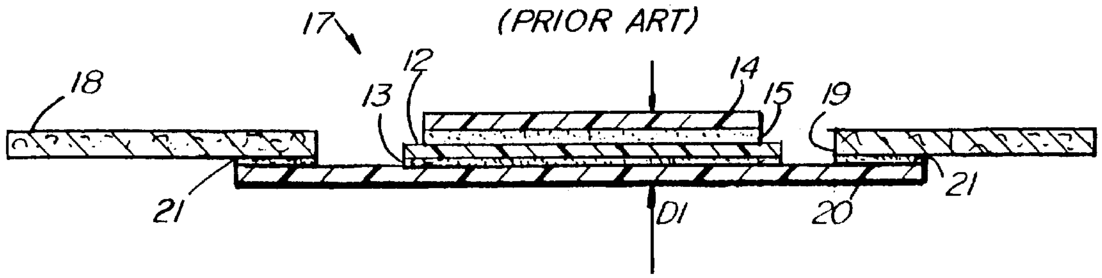
FIG. 2 (PRIOR ART)

Another prior art construction is illustrated in FIG. 2 at 17. This construction has a thickness D1 at the decal 14 which is somewhat less than that of the FIG. 1 construction, e.g. D1 being on the order of about 0.011 inches. In the construction of FIG. 2 the decal 14 with adhesive 15 and the release liner 12 with adhesive 13 are the same as in the FIG. 1 construction. However the construction 17 of FIG. 2 uses a paper carrier sheet 18 with a cutout 19 therein, and a patch 20 (such as of a conventional window patch material, such as glassine) is adhered by adhesive 21 to the bottom of the sheet 18. Since the patch 20 has a thickness less than that of the sheet 18, the dimension D1 is slightly less, but still not acceptable for many circumstances. Also in both the FIGS. 1 and 2 constructions recycling of the sheet 11, 18 is difficult because the release liner 12 and—in the case of the FIG. 2 construction—the glassine patch 20 are adhered to the rest of the sheet 11, 18.

Figure 3:
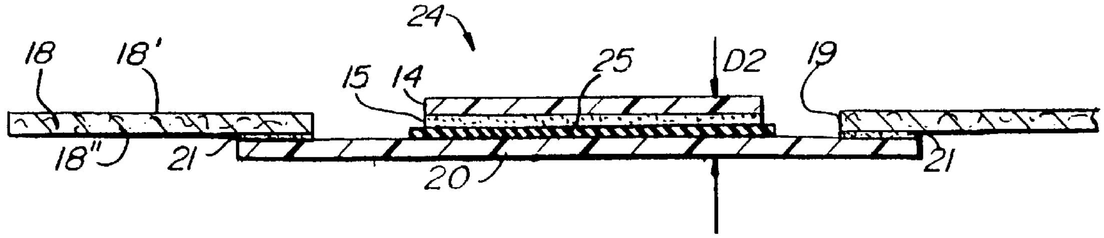
FIGS. 3 and 4 are views like those of FIGS. 1 and 2 but showing exemplary carriers according to the present invention.
Figure 4:
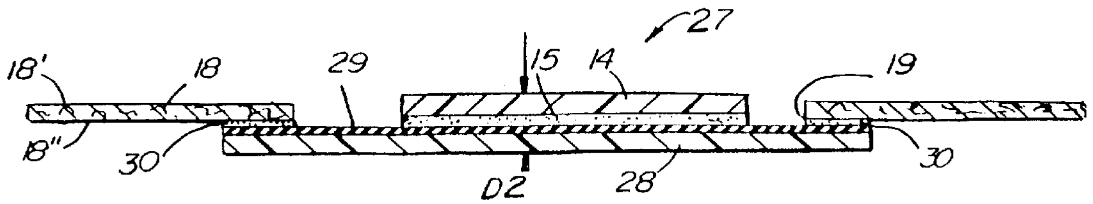
Figure 10:
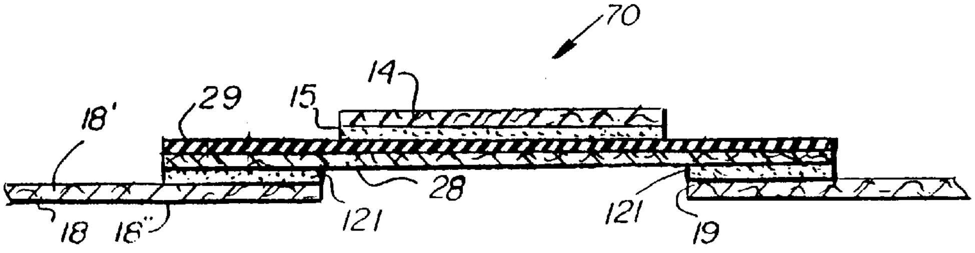
FIG. 10 is a view like that of FIG. 3 only showing another embodiment of an exemplary carrier according to the present invention.

According to the present invention the drawbacks associated with the prior art constructions of FIGS. 1 and 2 are significantly reduced or eliminated. Different major embodiments according to the present invention may be provided, the embodiments of FIGS. 3, 4, or 10. In the embodiments of FIGS. 3, 4, or 10 components having the same construction as those in the prior art configurations of FIGS. 1 and 2 are shown by the same reference numeral.

In the FIG. 3 embodiment 24 the major difference compared to the FIG. 2 prior art construction is that a spot coating 25 of adhesive release material (such as silicone, or any other conventional adhesive release material) is provided on that portion of the top face of the patch 20 within the cutout 19. The patch 20 is still affixed to the bottom face 18" of the carrier 18 paper sheet by the adhesive 21. The decal 14 is slightly above the top surface 18' of the carrier sheet 18. This construction eliminates the thickness of the release liner 12, so that the thickness D2 is 0.010 inches or less, typically about 0.008 inches. This makes a significant difference in the number of sheets that can be stacked in a printer tray, and in minimizing feeding problems.

The adhesive 21 preferably is any suitable conventional permanent pressure sensitive adhesive for holding a patch to a paper sheet. The adhesive 21 may be repositional adhesive, such as that available from Moore U.S.A. of Lake Forest, Ill. under the trademark "CLEANTAC", or the different type of repositional adhesive used in the "POST-IT" products available from 3M of Minneapolis, Minn., only if the environment of use is such that the patch 20 will not detach during handling (e.g. when passed through a laser or impact printer). If repositional adhesive can properly be provided as the adhesive 21, and does not permanently fuse during passage through a laser printer, then the entire patch 20 can be removed from the carrier 18, so that the carrier 18 may be recycled more easily, and also the user need only carry the patch 20 with decal 14 thereon to a vehicle location to apply the decal 14.

FIG. 4 illustrates another embodiment according to the present invention. In the FIG. 4 embodiment, 27 instead of a spot coating of release material like the coating 25 covering at least a majority of the central portion of the patch 20, an adhesive release coating 29 is provided which covers substantially the entire top face of the patch 28, including the periphery thereof. A suitable conventional aggressive adhesive 30 holds the patch 28 to the carrier 18, that is one capable of bonding even to silicone, or like, release coatings.

In the practice of the present invention the patches 20, 28 may be glassine or other translucent or transparent material, but need not necessarily be so because they typically will be provided on an interior of a mailer and therefore may be an opaque material. However the patch 28, 20 material should have a smaller thickness than the sheet 18 so that the thickness D2 is 0.010 inches or less, preferably about 0.008 inches.

Figure 5:
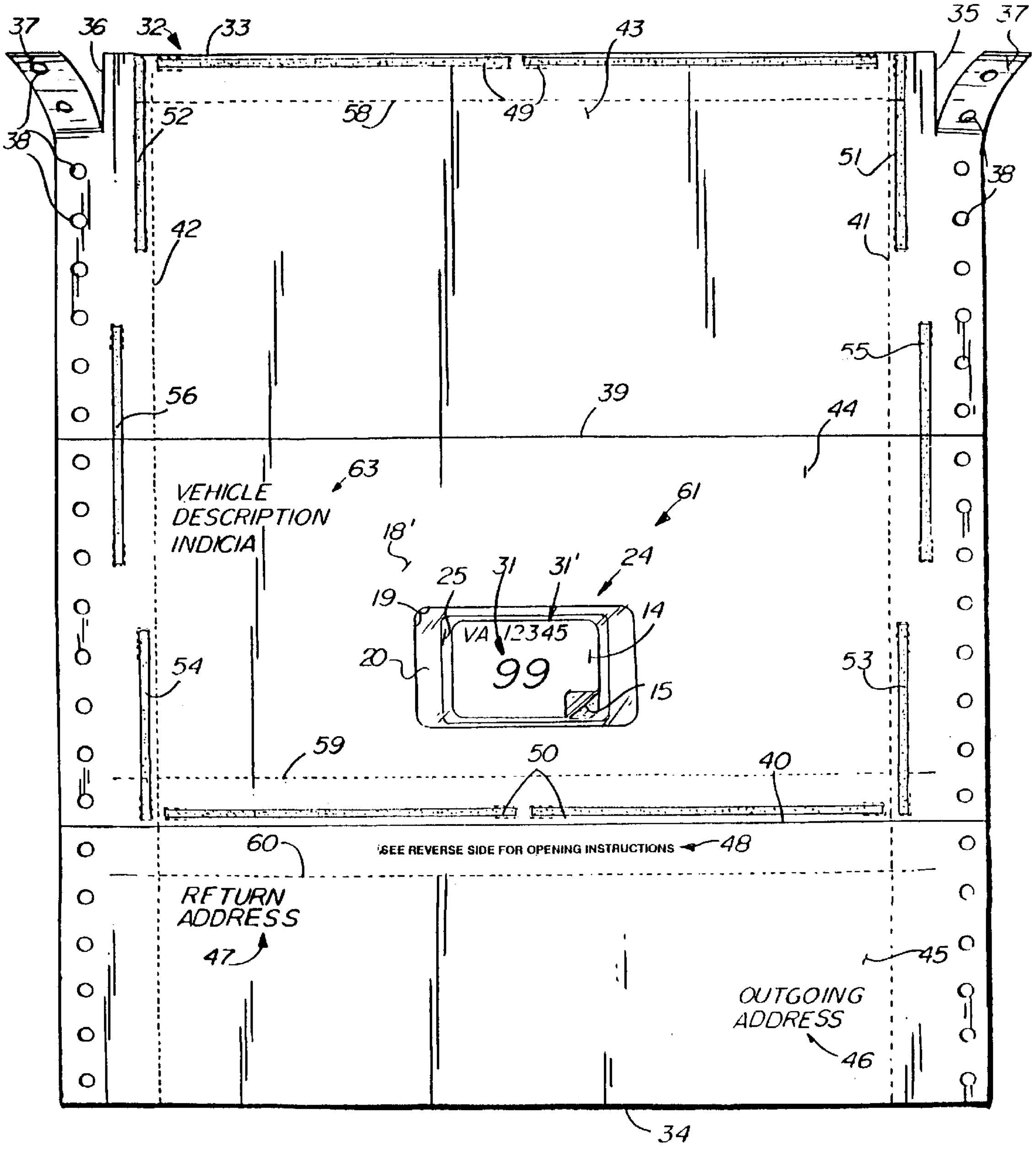
FIG. 5 is a top plan view of the carrier of FIG. 4 in the form of a mailer type business form intermediate.
Figure 6:
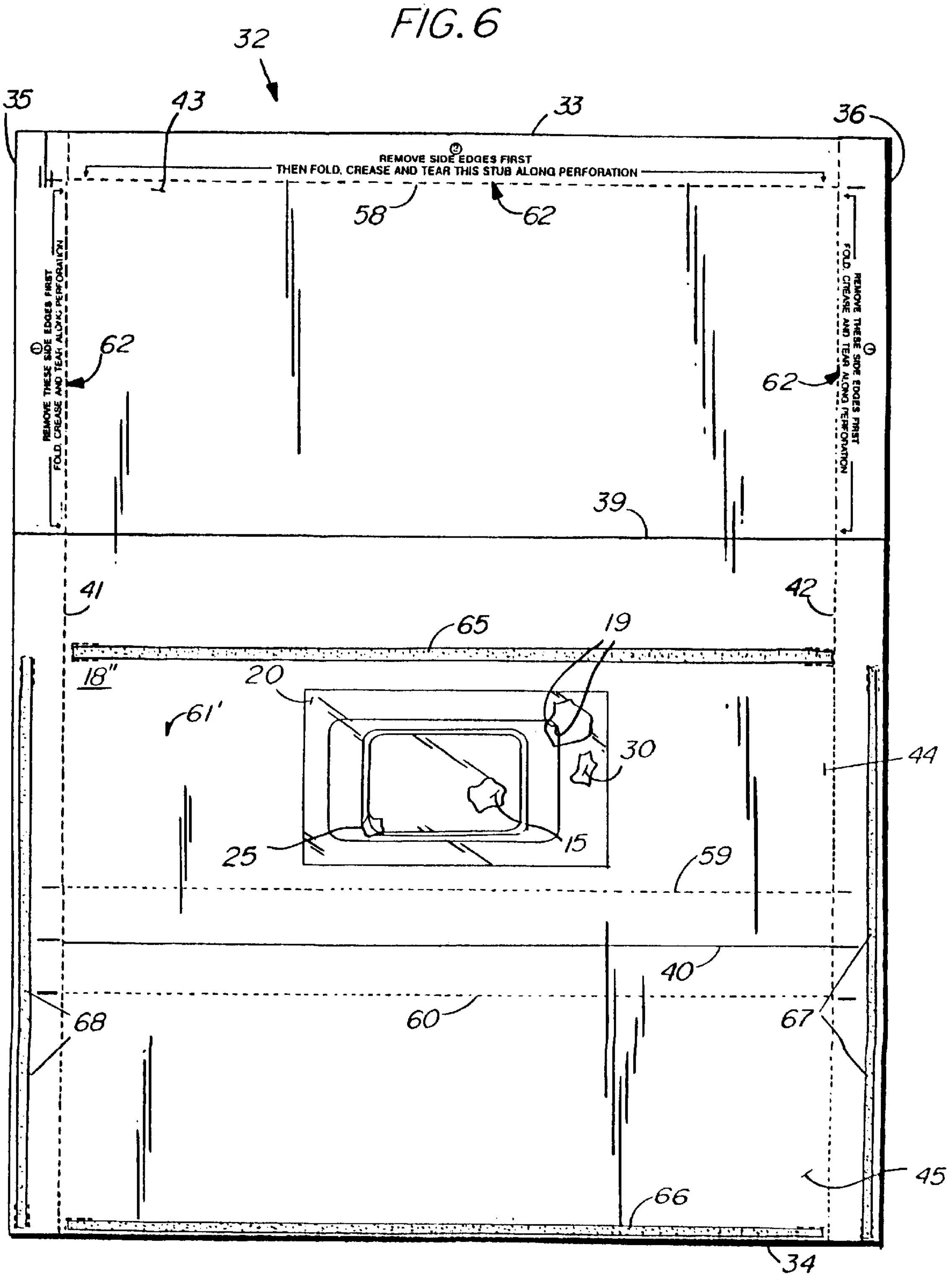
FIG. 6 is a bottom plan view of the intermediate of FIG. 5.
Figure 7:
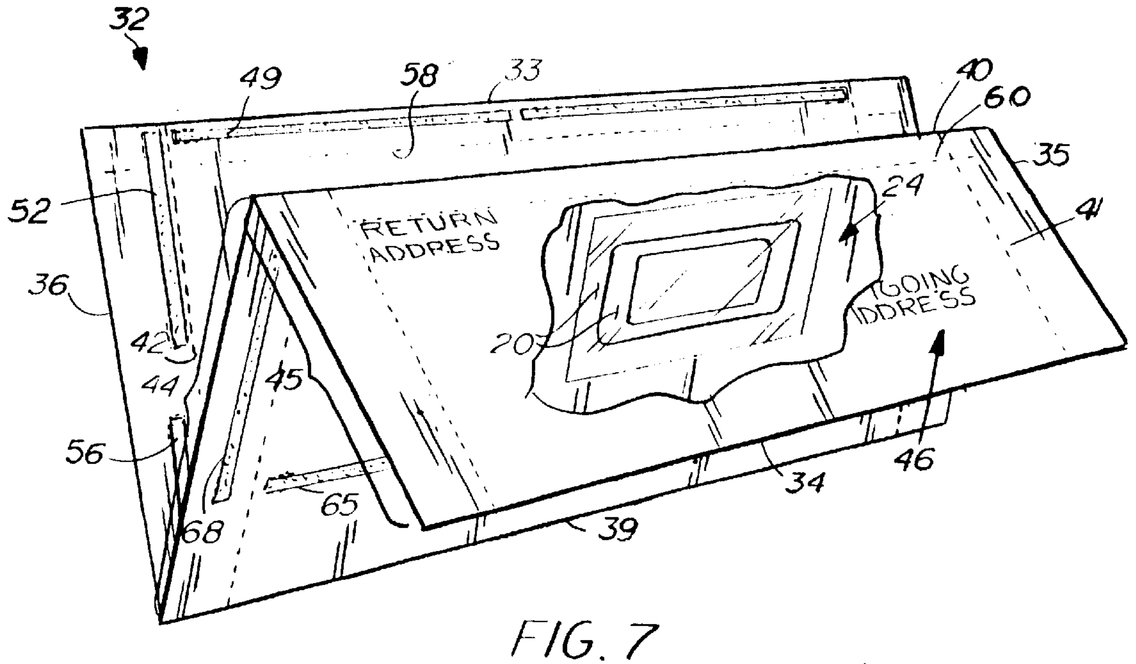
FIG. 7 is a top perspective view showing the intermediate of FIGS. 5 and 6 being folded into a mailer type business form according to the present invention.

The FIG. 3 embodiment is illustrated in association with a mailer intermediate in FIGS. 5 through 7. In FIG. 5 (as well as in FIGS. 8 and 9) one can see the license plate indicia 31, 31' which typically is provided on the top face of the decal 14 (opposite the face to which the adhesive 15 is applied). The indicia 31 in this embodiment includes license plate year of renewal indicia, while the indicia 31' may indicate the registering state or other registration information, or any other suitable indicia.

While a carrier per se may be provided according to the invention (which may merely be inserted into a conventional envelope), preferably the carrier sheet 18 is part of an intermediate 32 of a mailer type business form, as seen in FIGS. 5 through 7. The intermediate 32 is formed by the paper carrier sheet 18 which has quadrate configuration including top and bottom substantially parallel edges 33, 34, and substantially parallel side edges 35, 36. As seen in FIG. 5 preferably tractor drive strips 37, having tractor drive holes 38, are typically provided as part of the intermediate 32 during construction thereof, but the tractor drive strips 37 are slit off—at the side edges 35, 36—during processing by conventional slitters. This slitting is typically accomplished before the intermediate 32 is sent to the motor vehicle registration organization, or like entity which will be processing the intermediates 32 and sending them out in the mail, although the slitting may alternatively be accomplished at the final printing and mailing site.

The intermediate 32 is typically divided into panels by first and second fold lines 39, 40, respectively, which are substantially parallel to the edges 33, 34. The fold lines 39, 40 may be score lines, perforation lines, or any other suitable lines which facilitate folding (and perhaps detachment). The intermediate 32 also preferably includes perforation lines (or like lines of weakness) 41, 42 which are parallel to the side edges 35, 36.

The fold lines 39, 40 define the intermediate 32 into three panels, the first panel 43 between the edge 33 and the first fold line 39, a second panel 44 between the fold lines 39, 40, and a third panel 45 between the second fold line 40 and bottom edge 34. The fold lines 39, 40 in the embodiment illustrated in FIGS. 5 through 7 facilitate Z-folding of the intermediate 32, but alternatively the intermediate 32 could be constructed for C-folding, or other fold lines and panels could be provided so that other panel configurations are utilized. In the embodiment specifically illustrated in FIGS. 5 through 7 the length of the first and second panels 43, 44 along with side edges 35, 36 are the same, whereas the length of the third panel 45 along with side edges 35, 36 is—in the embodiment illustrated—significantly less than that of the first and second panels 43, 44 (although other embodiments with equal length panels may be provided). For example the first panels 43, 44 may have a length of four inches each, while the third panel 45 has a length of three inches, whereas the width of the entire intermediate 32 is 8½ inches, so that the intermediate 32 is made from a conventional 8½×11 inch sheet. The eccentric construction illustrated allows more data to be printed on the interior faces of the panel, particularly the face 18' of the panels 43, 44 illustrated in FIG. 5, for a given sheet size, while still obscuring the decal assembly 27 during mailing.

Various indicia may be applied to the face 18' as illustrated in FIG. 5. For example outgoing address indicia 46 and return address indicia 47. The indicia 46, 47 typically would be printed at the mailing location. Indicia 48 may also be provided as instructions on how the ultimate mailer formed from the intermediate 32 may be opened.

Adhesive means are provided for holding the intermediate in the form of a mailer after folding (e.g. Z-folding about the fold lines 39, 40 (see FIG. 7). The adhesive means may comprise any suitable adhesive disposed in any particular manner on the sheet 18. For example rewettable, heat activated, or standard pressure sensitive adhesive could be used, and it may be disposed in the form of discreet pattern elements such as dots, lines, or other shapes, or continuous strips. In the preferred embodiment the adhesive means comprises a pressure activated cohesive such as a styrene-natural rubber copolymer, as in U.S. Pat. No. 4,918,128. The pressure sensitive cohesive, in various trade available forms thereof, and patents showing the same, are disclosed in U.S. Pat. No. 5,201,464 (the disclosure of which is incorporated by reference herein).

While a wide variety of different patterns of the pressure sensitive cohesive may be provided, typical forms are illustrated at reference numerals 49 through 56 in FIG. 5 and by reference numerals 65–68 in FIG. 6. The strips 49 are adjacent the edge 33 and cooperate with the strips 50 adjacent the fold line 40 when the intermediate 32 is folded about the fold line 39, while the strips 51, 52 just outside of the perforation lines 41, 42 cooperate with the strips 53, 54 of the second panel 44, and the portions of the strips 55, 56 extending across the fold line 39 outside of the perforation lines 41, 42 cooperate with each other. The adhesive strips 49–56 are activated by passing the intermediate 32 through a pressure sealer which applies a force of about 100–200 pounds per inch to the strips 49–56 to effect sealing.

Lines of weakness (such as perforation lines) 58, 59, 60 are preferably also provided substantially parallel to the edges 33, 34. The perforation line 58 allows ready opening of the mailer form from the intermediate 32 since it is disposed between the adhesive strips 49 and the fold line 39, while the perforation line 59 is similarly disposed between the adhesive strips 50 and the fold line 39. The perforation lines 58–60 line up one on top of the other when intermediate 32 is Z-folded about the lines 39, 40, as illustrated in FIG. 7.

Various other indicia may be printed where desired on the intermediate 32. For example, further instruction indicia 61 associated with the decal assembly 27 may be provided on the face 18', and/or like indicia 61' (see FIG. 6) on the face 18". Further instruction indicia 62 (see FIG. 6) for opening up the completed mailer (see FIG. 7) may be provided on the face 18", while descriptive indicia such as about the vehicle or the registration of the vehicle—as illustrated at 63 in FIG. 5—may be provided. The face 18' of both panels 43, 44 provides the significant amount of area for printing any indicia desired. The indicia may be pre-printed before the intermediates 32 are sent to the organization that will be doing the mailing, or may be applied by a printer at the same time that the outgoing address 46, and the like, are applied.

The pressure cohesive strips 65–68 illustrated in FIG. 6 hold the panels 44, 45 together when the mailer is formed by folding (e.g. Z-folding, see FIG. 7), and the adhesive action of the strips 65–68 is activated at the same time as for the strips 49–56 by passing through conventional equipment for that purpose. The strips 65, 66 cooperate with each other when the intermediate 32 is Z-folded about the line 40, while the portions of the strips 67, 68 on the opposite sides of the fold line 40 cooperate with each other.

When the final mailer is formed, the second panel 44 is sandwiched between the first and third panels 43, 45, and the decal assembly 27 is not visible, being covered up by both the panels 43, 45. The adhesive strips 49–56 and 65–68 maintain the integrity of the mailer during subsequent mailing and other handling.

Figure 8:
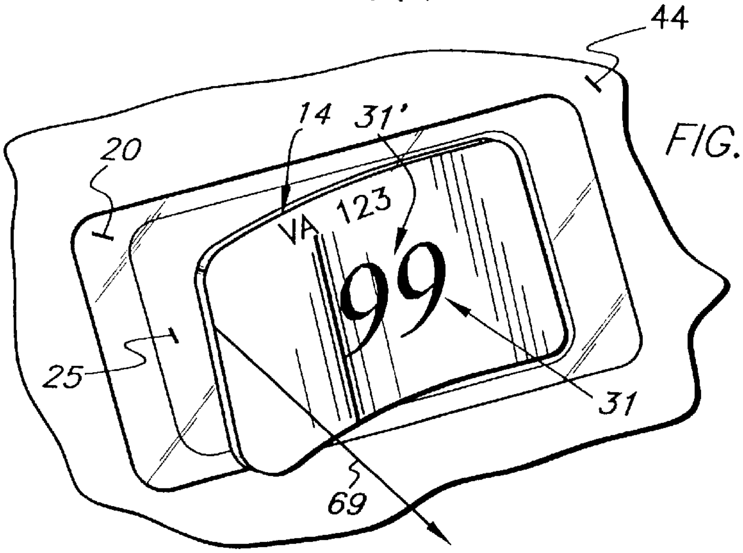
FIG. 8 shows the patch and decal associated with the mailer of FIG. 7 after they have been detached therefrom.

After the intermediate 32 is Z-folded into a mailer configuration, as illustrated in FIG. 7, it is passed through the conventional pressure sealing equipment, postage is applied (if not applied by printing earlier, such as a permanent number), and then the mailer is sent to the outgoing addressee indicated by the address 46. When the addressee receives the mailer of FIG. 7, he or she opens the mailer by following the instructions 62, that is by separation along the perforation lines 41, 42, and 58 through 60. This results in a sheet comprising merely the panel 43, 44 with the patch 28 still attached as illustrated in FIGS. 4 through 7. To facilitate recycling of that sheet and also to make utilization of the decal 14 simpler, the user (such as by following the instructions 61, 61') detaches the entire patch 28 from the panel 44, the adhesive 30 releasing. The detached patch 28 with decal 14 thereon is seen in FIG. 8. The decal 14 is then removed simply by peeling it off the release coating 29—as illustrated by arrow 69 in FIG. 8—and then the decal 14 is ready to be applied to a license plate 70 or windshield of a motor vehicle or the like.

Figure 9:
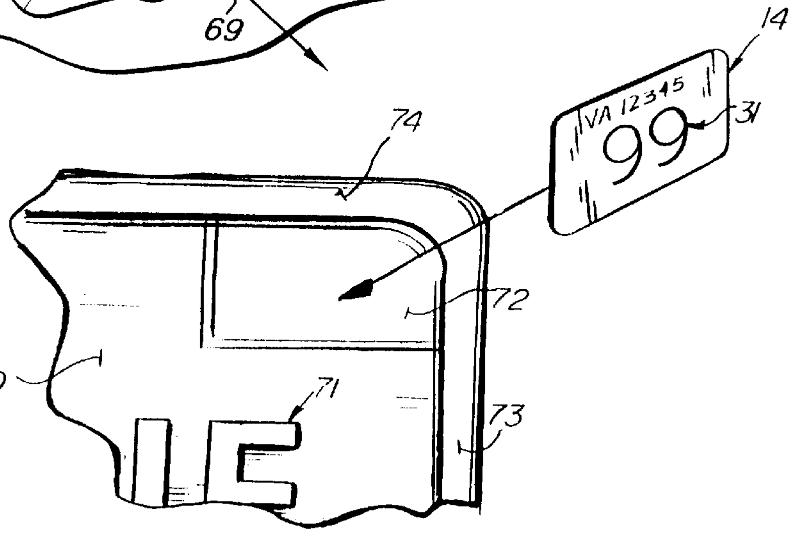
FIG. 9 is a schematic detail representation showing the application of the decal of FIG. 8 onto a license plate.

As illustrated in FIG. 9, the license plate 70 has a conventional license plate indicia 71 (typically either a unique identifying number, or a personalized license plate) and has a portion 72 thereof within the mounting frame 73 for the year of renewal decal 14 to be applied. The mounting frame 73 is attached to the motor vehicle 74 or the like. The adhesive 15 on the back of the decal 14 adheres to the metal plate 70 at the area 72, or to any previous decal that may be thereon. If decal 14 is a vehicle registration sticker (e.g. "county tag"), it may be applied to the inside of a windshield, the indicia visible through adhesive 15.

While the invention has been primarily described with respect to a license plate decal, it should be understood that any type of decal may be provided according to the invention, and any number of decals in a particular mailer. For example, two cutouts 19 and associated decal assemblies 24 may be provided associated with the panel 44 (one for each license plate), or a single larger cutout in which two decals 14 are provided on the same patch 20 with silicone coating spots 25, or a larger sheet can be used for the intermediate 32 with more folds and panels and any other number of decals may be mounted. Also, the decals 14 may have reflective surfaces, or can have other types of indicia besides license plate indicia, such as membership renewal indicia to put on a membership card or plaque or certificate, or any of a wide variety of other indicia. Instead of the indicia—such as the indicia 31 being provided on the opposite face of the decal 14 from the adhesive 15, or the decal 14 is designed to be applied to the inside of a window (of a dwelling or a motor vehicle) the indicia can be on the face of the decal 14 containing the adhesive 15 (or indicia can be provided on both faces), and visible through the adhesive 15.

FIG. 10 shows another exemplary decal assembly 70 according to the present invention. In FIG. 10 components that are identical to those in FIG. 4 are shown by the same reference numeral. The major difference between the assembly 70 of FIG. 10 and the assembly 27 of FIG. 4 is that the first pressure sensitive adhesive 121 (preferably a permanent adhesive) is applied to the bottom face of the patch 28, and the top face 18' of the sheet 18, so that even if the silicone coating 29 is provided over the entire top face of the patch 28 (as illustrated in FIG. 10, although the silicone coating 29 may be provided as a spot—like the spot 25 in FIG. 3) the adhesive 121 does not engage a silicone coating, but only the actual material (such as glassine) of the patch 28. In this way a wider variety of conventional adhesives may be used as the adhesive 121 (any suitable conventional pressure sensitive adhesive for holding patches to window envelopes).

Figure 11:
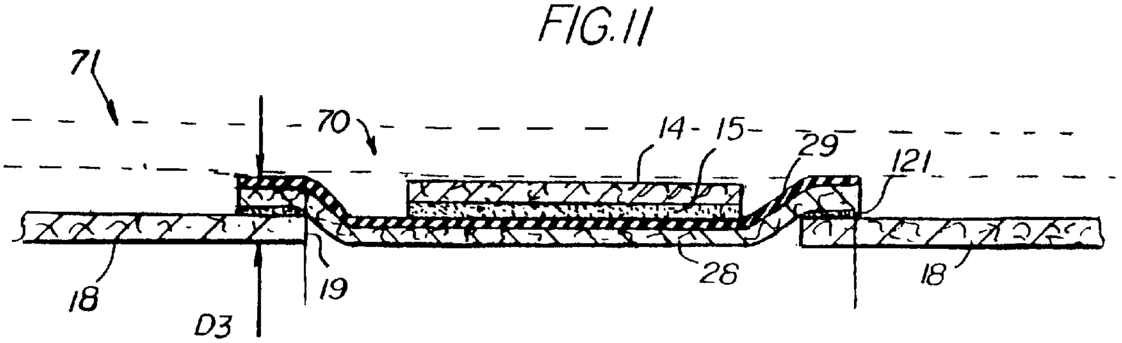
FIG. 11 is a view of the carrier of FIG. 10 shown in a stack of carriers so that the decal and patch flex into the cutout formed in the carrier paper sheet.

The effect of the construction in FIG. 10 is not to provide a thicker patch, such as in the FIG. 1 prior art construction, even though the thickness of the assembly 70 at the decal 14 when in the position in FIG. 10 is not much different than the distance D in the FIG. 1 prior art construction. However because of the positioning of the flexible patch 28 with respect to the cutout, and the dimensions of the decal 14 with respect to the cutout 19 (which are substantially the same as is illustrated for the decal 14 in FIGS. 5 through 7, except that at the lower and upper edges of the decal 14 as seen in FIGS. 5 and 6 the spacing will be somewhat greater to the cutout 19 than illustrated therein in order to allow complete flexure as will be described with respect to FIG. 11) so that when the sheet 18 is in a stack with other sheets 18 18 (such as in a printer), the patch 28 and decal 14 flex into the cutout 19 and the effective thickness D3 (see FIG. 11) of the assembly 70 is substantially the same as the combined thickness of the paper sheet 18, first adhesive 121, and patch 28 adjacent the cutout 19. FIG. 11 schematically illustrates this flexure of the decal 14 and patch 28 into the cutout 19 when a plurality of other sheets 71—all preferably like the sheet 18—are stacked thereon. The effective thickness D3 is thus substantially the same as, or slightly less than, the thickness D2 in FIGS. 3 and 4. That is the effective thickness D3 may be even less than 0.008 inches.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and products.

What is claimed is:

1. A mailer type business form intermediate comprising:

a quadrate paper sheet having top, bottom, and side edges, and first and second faces, said top and bottom edges substantially parallel to each other and said side edges substantially parallel to each other;

first and second fold lines substantially parallel to said top and bottom edges and dividing said sheet into first, second and third panels, said first panel between said top edge and said first fold line, and said second panel between said first and second fold lines;

said first and second panels each having a first length along said side edges, and said third panel having a second length along said side edges;

a cutout in said second panel;

a patch having first and second faces, a central area approximately the size of said cutout, and a peripheral area surrounding said central area;

a release coating provided on said first face of at least a significant part of said central area of said patch;

a first pressure sensitive adhesive disposed between said peripheral area of said patch and one of said faces of said second panel, and holding said patch to said second panel;

a decal having first and second faces;

indicia associated with at least one of said decal faces; and a second, permanent, pressure sensitive adhesive associated with said decal second face, said second adhesive engaging said release coating on said patch, and removable from said patch with said decal.

2. A mailer type business form intermediate as recited in claim 1 wherein said patch and decal mounted thereon have a thickness; and wherein said thickness of said patch and decal is about 0.008 inches; and wherein said paper sheet has a thickness which is less than said patch and decal mounted thereon thickness.

3. A mailer type business form intermediate as recited in claim 1 further comprising outgoing address indicia on said third panel first face.

4. A mailer type business form intermediate as recited in claim 3 further comprising adhesive means for holding said intermediate in a mailer configuration when said paper sheet is folded about said first and second fold lines to form a mailer having said second panel sandwiched between said first and third panels; and said first face of said third panel forming an outside face of the mailer and said decal and patch covered by said first and third panels, and wherein said second length is less than said first length.

5. A mailer type business form intermediate as recited in claim 4 wherein said adhesive means comprises a plurality of patterns of pressure activated cohesive.

6. A mailer type business form intermediate comprising:

a quadrate paper sheet having top, bottom, and side edges, and first and second faces, said top and bottom edges substantially parallel to each other and said side edges substantially parallel to each other;

first and second fold lines substantially parallel to said top and bottom edges and dividing said sheet into first, second and third panels, said first panel between said top edge and said first fold line, and said second panel between said first and second fold lines;

said first and second panels each having a first length along said side edges, and said third panel having a second length along said side edges;

a cutout in said second panel;

a patch having first and second faces, a central area approximately the size of said cutout, and a peripheral area surrounding said central area;

a release coating provided on said first face of at least a significant part of said central area of said patch;

a first pressure sensitive adhesive disposed between said peripheral area of said patch and one of said faces of said second panel, and holding said patch to said second panel;

a decal having first and second faces;

indicia associated with at least one of said decal faces;

a second, permanent, pressure sensitive adhesive associated with said decal second face, said second adhesive engaging said release coating on said patch, and removable from said patch with said decal; and wherein said first adhesive is disposed between said patch second face and said first face of said second panel, and wherein said patch is flexible and dimensioned with respect to said cutout so that when in a stack with other intermediates the patch and said decal thereon flex into said cutout and the effective thickness of said patch and decal are thereon is substantially the same as the combined thickness of said second panel, first adhesive, and patch adjacent said cutout.

7. A mailer type business form intermediate as recited in claim 6 further comprising outgoing address indicia on said third panel first face.

8. A mailer type business form intermediate as recited in claim 7 further comprising adhesive means for holding said intermediate in a mailer configuration when said paper sheet is folded about said first and second fold lines to form a mailer having said second panel sandwiched between said first and third panels; and said first face of said third panel forming an outside face of the mailer and said decal and patch covered by said first and third panels, and wherein said second length is less than said first length.

9. A mailer type business form intermediate as recited in claim 8 wherein said adhesive means comprises a plurality of patterns of pressure activated cohesive.

10. A mailer type business form intermediate comprising:

a quadrate paper sheet having top, bottom, and side edges, and first and second faces, said top and bottom edges substantially parallel to each other and said side edges substantially parallel to each other;

first and second fold lines substantially parallel to said top and bottom edges and dividing said sheet into first, second and third panels, said first panel between said top edge and said first fold line, and said second panel between said first and second fold lines;

said first and second panels each having a first length along said side edges, and said third panel having a second length along said side edges;

a cutout in said second panel;

a patch having first and second faces, a central area approximately the size of said cutout, and a peripheral area surrounding said central area;

a release coating provided on said first face of at least a significant part of said central area of said patch;

a first pressure sensitive adhesive disposed between said peripheral area of said patch and one of said faces of said second panel, and holding said patch to said second panel;

a decal having first and second faces;

indicia associated with at least one of said decal faces;

a second, permanent, pressure sensitive adhesive associated with said decal second face, said second adhesive engaging said release coating on said patch, and removable from said patch with said decal; and wherein said first pressure sensitive adhesive is disposed between said peripheral area of said patch first face and said second face of said second panel.

11. A mailer type business form intermediate as recited in claim 10 further comprising outgoing address indicia on said third panel first face.

12. A mailer type business form intermediate as recited in claim 11 further comprising adhesive means for holding said intermediate in a mailer configuration when said paper sheet is folded about said first and second fold lines to form a mailer having said second panel sandwiched between said first and third panels; and said first face of said third panel forming an outside face of the mailer and said decal and patch covered by said first and third panels, and wherein said second length is less than said first length.

13. A mailer type business form intermediate as recited in claim 12 wherein said adhesive means comprises a plurality of patterns of pressure activated cohesive.

14. A mailer type business form comprising:

a first solid paper panel;

a second paper panel having a cutout therein and first and second faces;

a third solid paper panel;

said second panel sandwiched between said first and second panels so that said cutout is covered by said first and second panels;

adhesive means for holding said panels to each other with said second panel sandwiched between said first and second panels;

a patch having first and second faces, a central area approximately the size of said cutout, and a peripheral area surrounding said central area;

a release coating provided on said first face of at least a significant part of said central area of said patch;

a first pressure sensitive adhesive disposed between said peripheral area of said patch and one of said faces of said second panel and holding said patch to said second panel;

a decal having first and second faces;

indicia associated with at least one of said decal faces;

a second, permanent, pressure sensitive adhesive associated with said decal second face, said second adhesive engaging said release coating on said patch, and removal from said patch with said decal; and wherein said first pressure sensitive adhesive is disposed between said peripheral area of said patch first face and said second face of said second panel.

15. A mailer type business form as recited in claim 14 wherein said patch and decal mounted thereon have a thickness; and wherein said thickness of said patch and decal is a maximum of 0.010 inches.

16. A mailer type business form comprising:

a first solid paper panel;

a second paper panel having a cutout therein and first and second faces;

a third solid paper panel;

said second panel sandwiched between said first and second panels so that said cutout is covered by said first and second panels;

adhesive means for holding said panels to each other with said second panel sandwiched between said first and second panels;

a patch having first and second faces, a central area approximately the size of said cutout, and a peripheral area surrounding said central area;

a release coating provided on said first face of at least a significant part of said central area of said patch;

a first pressure sensitive adhesive disposed between said peripheral area of said patch and one of said faces of said second panel and holding said patch to said second panel;

a decal having first and second faces;

indicia associated with at least one of said decal faces;

a second, permanent, pressure sensitive adhesive associated with said decal second face, said second adhesive engaging said release coating on said patch, and removal from said patch with said decal; and wherein said first adhesive is disposed between said patch second face and said first face of said second panel, and wherein said patch is flexible and dimensioned with respect to said cutout so that when in a stack with other intermediates the patch and said decal thereon flex into said cutout and the effective thickness of said patch and decal are thereon is substantially the same as the combined thickness of said second panel, first adhesive, and patch adjacent said cutout.

* * * * *